May 25, 1954

H. B. BARRETT 2,679,292

BRAKE LINING STRIPPER

Filed Sept. 10, 1949

INVENTOR
HARRY B. BARRETT
BY
ATTORNEY

May 25, 1954
H. B. BARRETT
2,679,292
BRAKE LINING STRIPPER
Filed Sept. 10, 1949
3 Sheets-Sheet 2
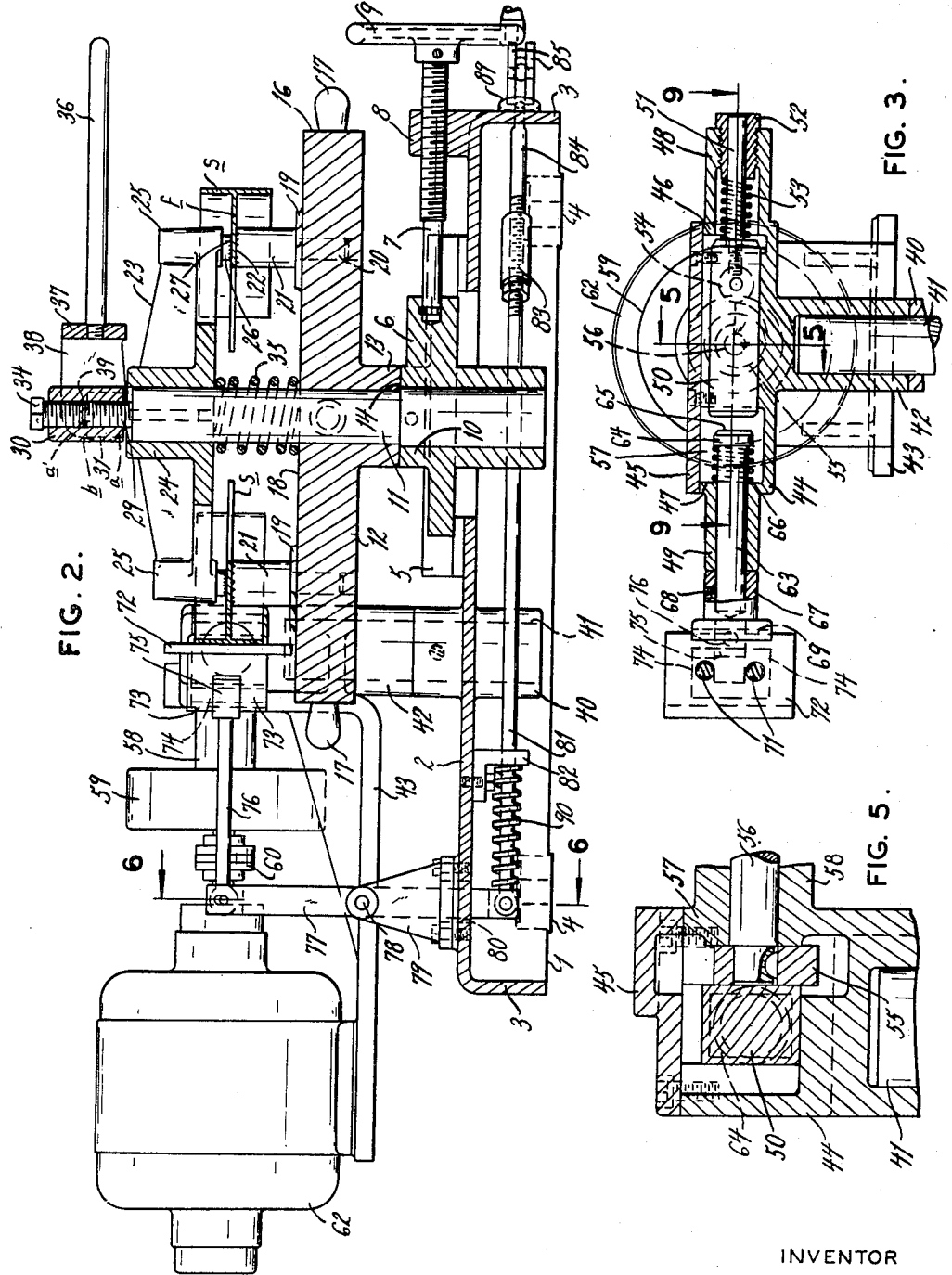
INVENTOR
HARRY B. BARRETT
BY
ATTORNEY May 25, 1954  H. B. BARRETT  2,679,292
BRAKE LINING STRIPPER Filed Sept. 10, 1949  3 Sheets-Sheet 3

INVENTOR
HARRY B. BARRETT
BY Alfred W. Petchaft
ATTORNEY

Patented May 25, 1954

2,679,292

UNITED STATES PATENT OFFICE 2,679,292

BRAKE LINING STRIPPER

Harry B. Barrett, St. Louis, Mo.

Application September 10, 1949, Serial No. 115,074

4 Claims. (Cl. 164—48)

This invention relates in general to certain new and useful improvements in machinery for delining automotive brakes and, more particularly, to a brake lining stripper.

Brake lining material is generally secured to automotive brake shoes either by means of a plurality of countersunk rivets or by means of a thermo-setting adhesive. When the lining is worn and in need of replacement, the worn lining must, of course, be removed to prepare the brake shoes for relining. The repair shop, brake service station, and automobile mechanic is thus presented with an extremely tedious problem. If the old lining has been riveted to the shoes, it is necessary to drill or punch out and separately remove a hundred or more rivets, since brake shoes frequently have in excess of a dozen rivets each and there are eight shoes per automobile. If, on the other hand, the old lining has been adhesively secured or "bonded" as it is called, there is no known, convenient, efficient means for lining removal.

It is, therefore, the primary object of the present invention to provide a machine for removing or stripping riveted or bonded brake lining from automobile brake shoes in a simple, efficient, and rapid manner.

It is a further object of the present invention to provide a brake lining stripper which is simple, rugged, and durable in construction and is economical to maintain and operate.

It is an additional object of the present invention to provide a brake lining stripper which can readily be operated by ordinary mechanics without any special training or experience and may be employed for removal of worn brake lining from brake shoes without any danger of damaging the brake shoe.

With the above and other objects in view, my invention resides in the novel features of form, construction, arrangement, and combination of parts presently described and pointed out in the claims.

In the accompanying drawings (three sheets):

Figure 1 is a top plan view of a brake lining stripper constructed in accordance with and embodying the present invention;

Figures 2, 3, and 4 are vertical sectional views taken along lines 2—2, 3—3, and 4—4, respectively, of Figure 1;

Figure 5 is a fragmentary sectional view taken along line 5—5 of Figure 3;

Figure 1:
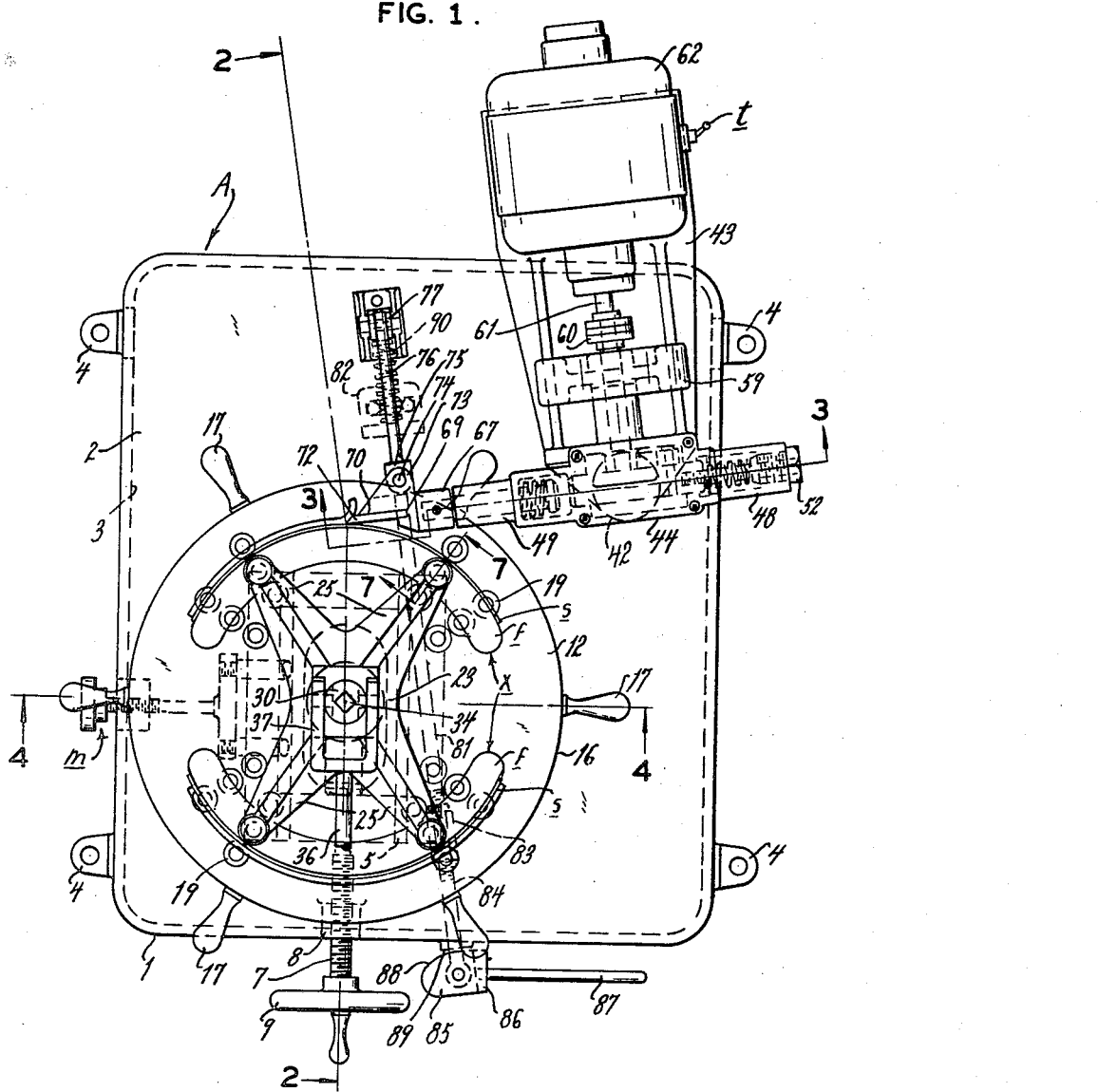

Broadly speaking, the present invention resides in the provision of a relatively heavy stable base member on which is mounted a manually rotatable or power driven work-supporting head having means for clamping one or more brake shoes in concentric relation to the center of rotation of the work-supporting head. Resiliently and adjustably mounted on the base member is a power driven vibratory tool provided with a chisel-shaped bit for application somewhat tangentially to the brake shoes along the interface between the shoe and the lining.

Referring now in more detail and by reference characters to the drawings, A designates a brake lining stripper comprising a heavy cast iron base 1 of rectangular shape having a flat top member 2 integrally bounded by a downwardly extending peripheral flange 3 having a plurality of laterally projecting ears 4 suitably apertured for accommodating bolts, screws, or other conventional attachment means by which the base 1 may be attached to a supporting table, work bench, or the like (not shown).

Shiftably mounted on the base 1 between slideways 5 is a slide 6 operatively connected to one end of a positioning screw 7, which is, in turn, threadedly mounted in and extends through an upstanding boss 8 formed integrally on the forward margin of the base 1. Pinned upon the forwardly projecting end of the screw 7 is a hand wheel 9 by which the screw 7 may be manipulated. Formed centrally of the slide 5 is a vertical bearing sleeve 10 bored for rotatably supporting the lower end of a spindle 11, which extends vertically upwardly therefrom. Rigidly mounted upon the spindle 11 just above the sleeve 10 is a relatively large circular work-supporting head or turntable 12 having an integrally formed downwardly projecting collar 13 machined off on its downwardly presented face 14 for smooth rotative abutment against the upwardly presented face of the sleeve 10. Around its peripheral face 16, the head 12 is provided with a plurality of uniformly spaced, radially projecting handles 17 by which the head 12 may be manually turned by the operator, as will be presently more fully discussed.

Figure 4:
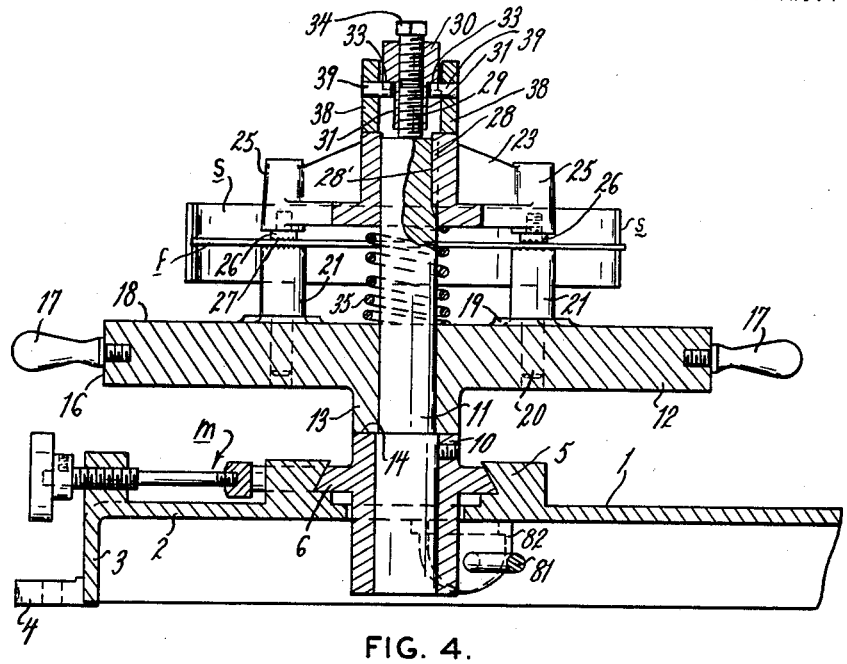
Figure 6:
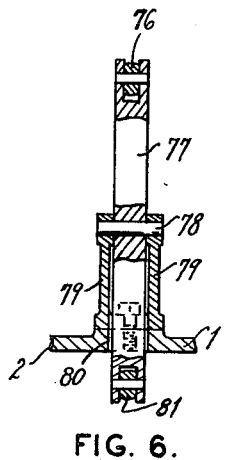
Figure 6 is a fragmentary sectional view taken along line 6—6 of Figure 2.
Figure 7:
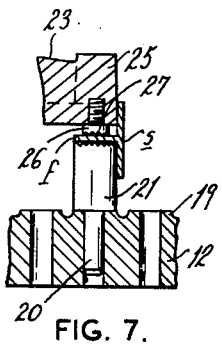
Figure 7 is a fragmentary sectional view taken along line 7—7 of Figure 1.

Upon its upper flat face 18, the head 12 is integrally provided with a plurality of small circular bosses 19 arranged in various spaced sets of four, the bosses 19 in each set being located at the same radial distance from the center. All the bosses 19, furthermore, are vertically drilled to the same size for interchangeably receiving the diametrally reduced lower end 20 of work-supporting studs 21, the upper transverse end faces 22 of which are serrated and hardened to bite grippingly into the flanges f of brake shoes s, as best seen in Figure 4.

Removably and shiftably mounted upon the spindle 11 in upwardly disposed relation to the head 12 is a clamping frog 23 integrally including a vertical sleeve 24 and four radially projecting symmetrically spaced arms 25 provided in the outer ends with downwardly presented removable plugs 26 having serrated under faces 27 and being located in vertical alignment with the studs 21. The sleeve 24 is furthermore provided with a radially inwardly projecting key-forming tongue 28 for snug-fitting sliding engagement within a key-slot 28' milled in the upper end of the spindle 11. It should be noted in this connection that the four studs 21 can be placed in a selected set of four bosses 19 for accommodating a range of different sizes of brake shoes, and, correspondingly, a plurality of clamping frogs 23 to match each set of stud positions.

The upper end of the spindle 11 is turned down and threaded in the provision of a fixture stud 29 for adjustably receiving an internally threaded bonnet-sleeve 30, which is segmentally flatted or milled off along its lower portion to form diametrally opposite vertical faces 31 and downwardly presented flat shoulders 32 centrally provided with semi-circular detent notches 33. Threaded down from the upper end into the bonnet-sleeve 30 is a bolt 34 for endwise abutment against the stud 29 to lock the sleeve 30 in any selected position of vertical adjustment.

Disposed encirclingly about the spindle 11 in endwise abutment at its opposite ends respectively against the upper face 18 of the head 12 and the under face of the frog 23 is a spiral compression spring 35 adapted normally to hold the frog 23 in upwardly spaced relation above the studs 21, so that the brake shoes s may be freely inserted between the serrated faces 22, 27. Provided for removable disposition above the frog 23 is a locking handle 36 rigidly provided at its end with a U-shaped yoke 37 having parallel legs 38, the inner faces of which are spaced apart by a distance slightly greater than the outside diameter of the bonnet-sleeve 30. The legs 38 are provided with inwardly projecting axially aligned pins 39, the end faces of which are spaced apart by a distance slightly greater than the distance between the flat faces 31 of the bonnet-sleeve 30 and are adapted to slide under the shoulders 32 thereof and become engaged in the detent notches 33. It should be noticed that the pins 39 are located substantially closer to the upper horizontal margins of the yoke legs 38 when the handle 36 is in the position shown in Figures 2 and 4. The yoke-legs 38 are furthermore provided with identically shaped transverse end faces consisting of two cam-like arcs a, a', tangentially curving into a centrally located flat or dwell portion b, the latter being preferably disposed at an angle slightly less than 90° to the longitudinal axis of the handle 36.

Figure 8:
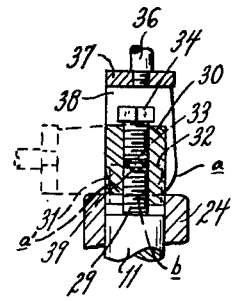
Figure 8 is a fragmentary sectional view of the locking handle.
Figure 9:
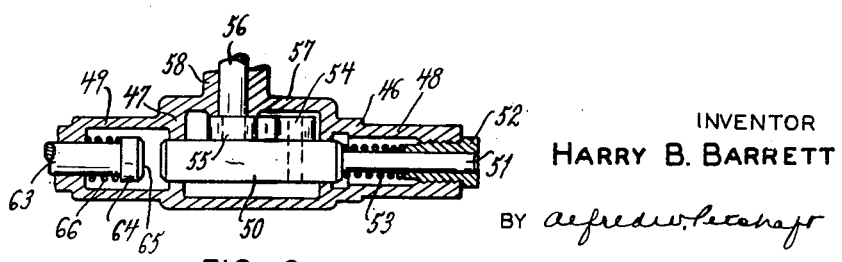
Figure 9 is a fragmentary sectional view taken along line 9—9 of Figure 3.

The handle 36 is thus constructed in such a manner that it may be swung upwardly through an arc of approximately 90° to the position shown in Figure 8, whereupon the flat faces b will be presented downwardly toward the frog 23 and the spring 35 will, in turn, force the frog 23 upwardly into engagement therewith, so that the handle 36 will, in effect, stand upright and the frog 23 will be displaced upwardly out of clamping position, so as to facilitate insertion of the brake shoes s. When it is necessary to place the studs 21 in different positions for accommodation of a larger or smaller brake shoe and it thus becomes correspondingly necessary to change the frogs 23, the handle 36 may be swung over through an arc of 90° to the position shown in dotted lines in Figure 8. In this position, the normally upper edge of the legs 38 will be presented downwardly toward the frog 23. The spring 35, however, is of such length that it will not raise the frog 23 upwardly much beyond the full line position shown in Figure 8. Therefore, the handle 36 will now have sufficient clearance to permit the pins 39 to drop downwardly out of the detent notches 33, whereupon the handle 36 can be pulled outwardly and completely disengaged. The frog 23 may then be lifted upwardly off of the spindle 11 and another frog 23 of the required size may be set in place. The handle 36 may then be slipped back into place and swung into upright or standing position.

Formed integrally in, and extending vertically through, the base plate 1 rearwardly and to one side of the slide 6 is a bearing sleeve 40 bored for rotatably receiving the lower end of a bearing pin 41, which extends upwardly therefrom and is rigidly mounted in a sleeve 42 formed integrally with a horizontally extending motor support or carriage 43 whereby the latter is supported for rocking movement in upwardly spaced parallel relation to the base 1. Integrally formed with, and extending transversely across, the forward end of the motor support 43 in upwardly spaced relation to the sleeve 42 is an elongated open-topped housing 44 provided with a flat cover plate 45 and having transverse end walls 46, 47, which are, in turn, provided with axially aligned outwardly extending tubular sleeves 48, 49.

Operatively mounted within the housing 44 for longitudinal shifting movement is a hammer bar 50 having an axially extending tail rod 51 which projects through the sleeve 48 and is slidably held within a tubular adjustment screw 52 threadedly mounted in and extending through the outer end wall of the sleeve 48. Disposed encirclingly around the tail rod 51 and abutting at its opposite ends against the end faces of the hammer block 50 and the adjustment screw 52 is a compression spring 53. Operatively mounted upon the rearwardly presented face of the hammer block 50 is a roller or cam follower 54 adapted for operative engagement against the cam face of a trip hammer cam 55 keyed upon the end of a shaft 56 journaled in and extending rearwardly through the back wall 57 of the housing 44 through a journal sleeve 58. On its rearward end, the shaft 56 is provided with a relatively heavy fly-wheel 59 and is pinned into one end of a conventional shaft coupling 60, which is, in turn, at its other end pinned upon the forward end of a drive shaft 61 of a conventional electric motor 62 bolted or otherwise rigidly secured upon the rearward end of the motor support or carriage 43. The motor 62 is provided with a conventional toggle switch t and is connected to any ordinary source of electrical power (not shown).

Slidably mounted in, and extending through, the tubular housing sleeve 49 is an impact rod 63 which extends at one end into the housing 64 and on such end is provided with a diametrally enlarged head 64 having an end face 65. Disposed encircling about the inwardly projecting end of the bracket rod 63 in abutment at its opposite ends against the inner face of the housing side wall 47 and the under face of the head 64 is a compression spring 66 of such length as to normally hold the impact rod 63 in inwardly shifted position with its end face 65 in spaced relation to the opposed face of the hammer block 50 when the latter is in withdrawn position, as shown in Figure 3. On its outwardly projecting end, the impact rod 63 is provided with a tool supporting head 67 held in place by means of a set screw 68 and provided with a vertically extending slot 69 and tool face 70. Removably mounted by means of countersunk screws 71 upon the tool face 70 with its butt-end held within the slot 69 is a chisel-shaped tool bit 72. Rearwardly of the tool face 70, the tool supporting head 67 is integrally provided with a pair of vertically spaced ears 73 drilled for receiving a vertical pin 74. Rockably mounted upon the pin 74 and held thereby snugly between the ears 73 is the enlarged end 75 of a tool control rod 76, the rear end of which is rockably pinned to the upper end of a vertical link 77, which is, in turn, fulcrumed at its approximate mid point upon a horizontal pin 78 mounted at its ends in spaced parallel ears 79 formed integrally with and projecting upwardly from the base plate 1. Between the ears 79, the base plate 1 is provided with an elongated slot 80 through which the lower end of the link 77 projects, and at its downwardly projecting end the link 77 is rockably pinned to a forwardly extending link-actuating rod 81, which extends slidably through an L-shaped bracket 82 bolted upon the under face of the base plate 1 and is threaded into a length-adjustment sleeve 83. Threaded into and extending forwardly from the other end of the length adjustment sleeve 83 is an extension rod 84, which projects slidably through a suitably formed aperture in the forward portion of the base flange 2 and is pinned between the spaced parallel legs 85 of a yoke 86 rigidly mounted on the end of an actuating handle 87. The legs 85 are provided with cam-like rearwardly presented arcuate faces 88 adapted to bear against a suitably provided boss 89 formed integrally upon the forwardly presented face of the base flange 2.

Disposed encirclingly about the rod 81 and abutting at its opposite ends against the forwardly presented face of the link 77 and the rearwardly presented face of the bracket 82 is a spiral compression spring 90 for biasing the lower end of the link 77 and its associated actuating rod 81 rearwardly and correspondingly urging the control rod 76 and the tool-supporting head 67 forwardly.

In use, the handle 36 is swung to upright position (as shown in full lines in Figure 8) and a matching pair of brake shoes s inserted beneath the frog 23 with their flanges f resting in balanced relation upon the studs 21. Thereupon the handle 36 is swung down to the position shown in Figure 2 forcing the frog 23 down into tight clamping engagement upon the brake shoe flanges f. During this operation, the work-supporting head 12 should be rotated to a position approximately 90° from that shown in Figure 1, so that the space (as indicated at x) between the brake shoes s will be opposite the forwardly biased tool bit 70.

When the shoes have been clamped in place, the handle 87 is pulled outwardly by the operator to shift the tool rearwardly, causing the motor support or carriage 43 to pivot accordingly on the pin 41 and the motor switch t is turned on. In this connection, it should be noted that the control rod 76 is somewhat loosely fitted into the upper end of the link 77 to allow for the slight amount of necessary lateral movement in the control rod 76 during actuation of the handle 87.

Upon rearward movement of the tool bit 70, the work-supporting head is manually rotated until the edge of the brake lining on one of the shoes s is practically aligned with the cutting edge of the tool bit 70, whereupon the handle 87 is released to permit the tool bit 70 to swing forwardly again into operative engagement against the face of the brake shoe s. The work-supporting head is then manually turned in a clockwise direction (reference being made to Figure 1) to feed the shoe and lining into the cutting bit 70 which is rapidly vibrated and will automatically chisel the lining away from the brake shoe. As the first brake shoe is completed, the tool bit 70 will drop over the end thereof and swing inwardly again toward the center of the work-supporting head 12. The handle 87 is thereupon again manipulated as the head 12 is turned to bring the tool bit 70 into operative cutting engagement with the other brake shoe.

In order to set up the stripping machine A for brake shoes of different diameter than the brake shoes s shown, a different clamping frog 23 may be installed and the studs 21 appropriately repositioned as previously described. It is also necessary to rotate the hand wheel 9 and thereby shift the slide 6 in or out, as the case may be, to locate the spindle 11 and work-supporting head 12 at the proper distance from the tool bit 70 to accord with the particular diametral size of brake shoe for which the stripper A is being set up. When the slide 6 is properly positioned, it may be locked in such position by a conventional slide-locking mechanism m.

It should be understood that changes and modifications in the form, construction, arrangement, and combination of the severals parts of the brake lining stripper may be made and substituted for those herein shown and described without departing from the nature and principle of my invention.

Having thus described my invention what I now claim and desire to secure by Letters Patent is:

1. A machine for stripping lining from automotive brake shoes which comprises a base, a turntable operatively mounted on the base, a clamping fixture for holding a brake shoe rigidly on the turntable, a supporting carriage rockably mounted on the base for movement about an axis perpendicular to the base, a tool reciprocatorily mounted on the carriage for vibratory movement in the direction of its longitudinal axis, said longitudinal axis being presented toward the brake shoe when the latter is in clamped position, said tool having a chisel-like cutting edge disposed at right angles to the longitudinal axis of the tool, power driven means for rapidly reciprocating said tool, and means for swinging said tool and its associated carriage toward and away from the brake shoe.

2. A machine for stripping lining from automotive brake shoes which comprises a base having a flat face, a spindle mounted in and extending perpendicularly outwardly from said flat face, a turn-table rotatably mounted on the spindle, means on the turn-table for rigidly securing to the turn-table a brake shoe from which the lining is to be removed, a bearing pin operatively mounted in the base and extending outwardly from the flat face thereof in spaced parallel relation to the spindle, a carriage operatively mounted on the pin in upwardly spaced relation to the base and for rocking movement about the pin as an axis, a chisel-shaped tool reciprocatively mounted on the carriage in spaced parallel relation to the face of the base and extending outwardly from the carriage toward the turntable for presentation tangentially against the brake shoe secured upon the turn-table, power driven means also mounted on the carriage and operatively connected to the chisel for producing rapid vibratory reciprocation thereof, said chisel-shaped tool having a cutting bit adapted for cutting engagement against said brake shoe along the line of the interface between the shoe and the lining to be removed therefrom, and remotely controlled actuating means operatively connected to the carriage eccentric with respect to the pin for bodily swinging the carriage and all elements carried thereby about the pin as an axis.

3. A machine for stripping lining from automotive brake shoes which comprises a base having a flat face, a spindle mounted in and extending perpendicularly outwardly from said flat face, a turntable rotatably mounted on the spindle, means on the turntable for rigidly securing to the turntable a brake shoe from which the lining is to be removed, a bearing pin operatively mounted in the base and extending outwardly from the flat face thereof in spaced parallel relation to the spindle, a carriage operatively mounted on the pin in upwardly spaced relation to the base and for rocking movement about the pin as an axis, a chisel-shaped tool reciprocatively mounted on the carriage in spaced parallel relation to the face of the base and extending outwardly from the carriage toward the turntable for presentation tangentially against the brake shoe secured upon the turntable, power driven means also mounted on the carriage and operatively connected to the chisel for producing rapid vibratory reciprocation thereof, said chisel-shaped tool having a cutting bit adapted for cutting engagement against said brake shoe along the line of the interface between the shoe and the lining to be removed therefrom, remotely controlled actuating means operatively connected to the carriage eccentric with respect to the pin for bodily swinging the carriage and all elements carried thereby about the pin as an axis, and a spring operatively bearing at one end against the remotely controlled actuating means for biasing the tool toward the surface of the brake shoe.

4. A machine for stripping lining from automotive brake shoes which comprises a base having a flat face, a spindle mounted in and extending perpendicularly outwardly from said flat face, a turntable rotatably mounted on the spindle, means on the turntable for rigidly securing to the turntable a brake shoe from which the lining is to be removed, a bearing pin operatively mounted in the base and extending outwardly from the flat face thereof in spaced parallel relation to the spindle, a carriage operatively mounted on the pin in upwardly spaced relation to the base and for rocking movement about the pin as an axis, a chisel-shaped tool reciprocatively mounted on the carriage in spaced parallel relation to the face of the base and extending outwardly from the carriage toward the turntable for presentation tangentially against the brake shoe secured upon the turntable, power driven means also mounted on the carriage and operatively connected to the chisel for producing rapid vibratory reciprocation thereof, said chisel-shaped tool having a cutting bit adapted for cutting engagement against said brake shoe along the line of the interface between the shoe and the lining to be removed therefrom, remotely controlled actuating means operatively connected to the carriage eccentric with respect to the pin for bodily swinging the carriage and all elements carried thereby about the pin as an axis, a spring operatively bearing at one end against the remotely controlled actuating means for biasing the tool toward the surface of the brake shoe, and means operatively associated with the remotely controlled actuating means for limiting the rocking movement of the tool toward the brake shoe.

References Cited in the file of this patent

UNITED STATES PATENTS

| Number | Name | Date |
|---|---|---|
| 1,292,494 | Lorenz | Jan. 28, 1919 |
| 1,609,514 | Kimmerling | Dec. 7, 1926 |
| 1,653,104 | Kimmerling | Dec. 20, 1927 |
| 1,834,762 | Bjorklund | Dec. 1, 1931 |
| 1,945,883 | Connelly | Feb. 6, 1934 |
| 2,344,928 | Wheeler | Mar. 21, 1944 |
| 2,356,864 | Martin | Aug. 29, 1944 |
| 2,395,112 | Gardner | Feb. 19, 1946 |
| 2,478,982 | Rishell | Aug. 16, 1949 |
| 2,530,134 | Taylor et al. | Nov. 14, 1950 |
| 2,603,290 | Lindemann | July 15, 1952 |

FOREIGN PATENTS

| Number | Country | Date |
|---|---|---|
| 64,207 | Switzerland | Dec. 21, 1912 |